Figure 1:
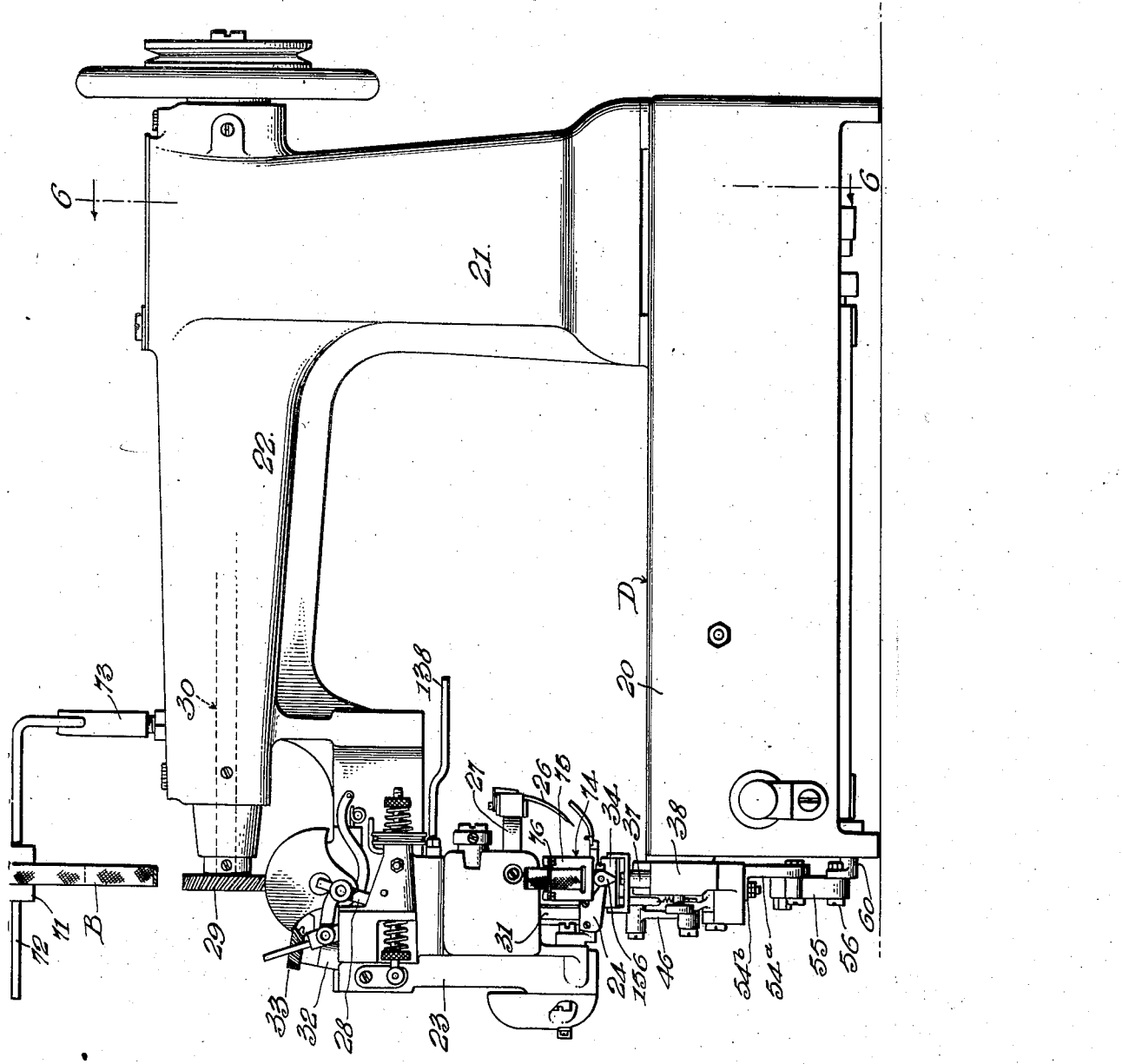

April 5, 1938. L. G. BOWMAN 2,113,107
BLIND STITCH SEWING MACHINE
Filed Oct. 17, 1936 10 Sheets-Sheet 2
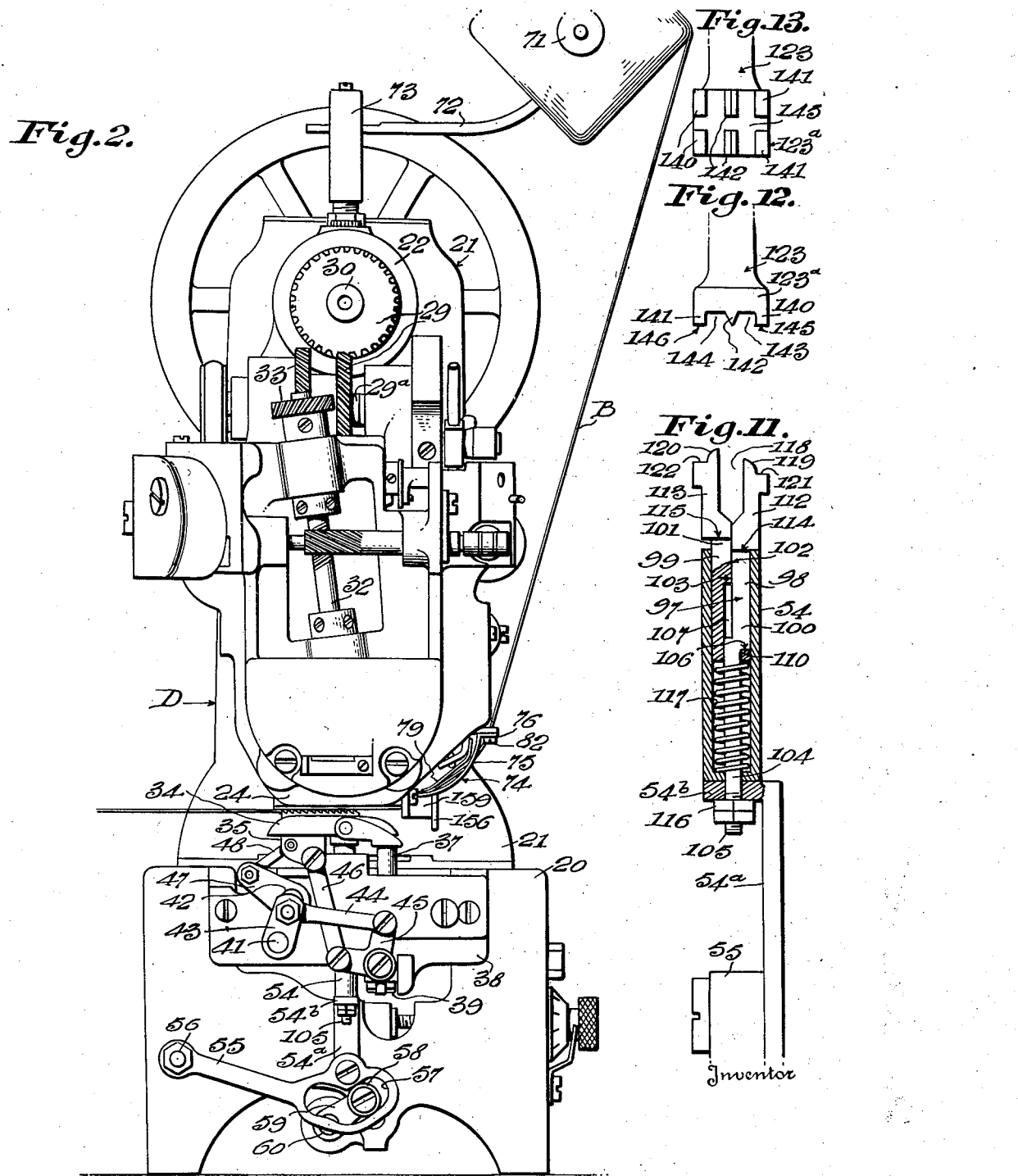
Inventor
Louis G. Bowman
By S. George Tate Attorney.

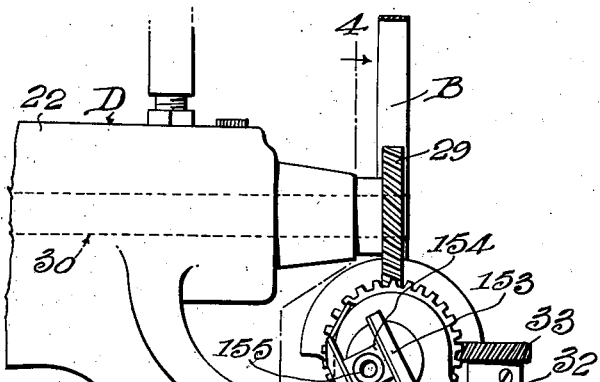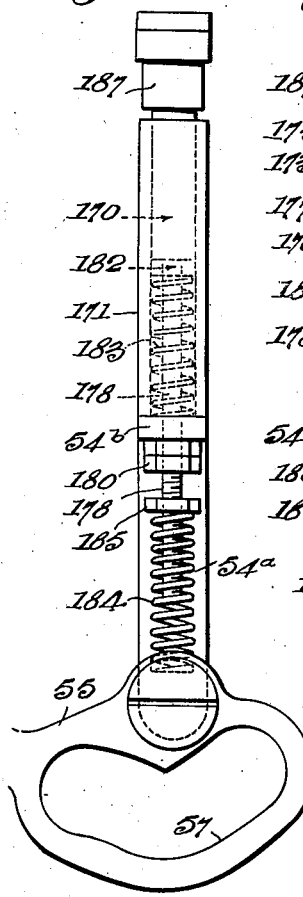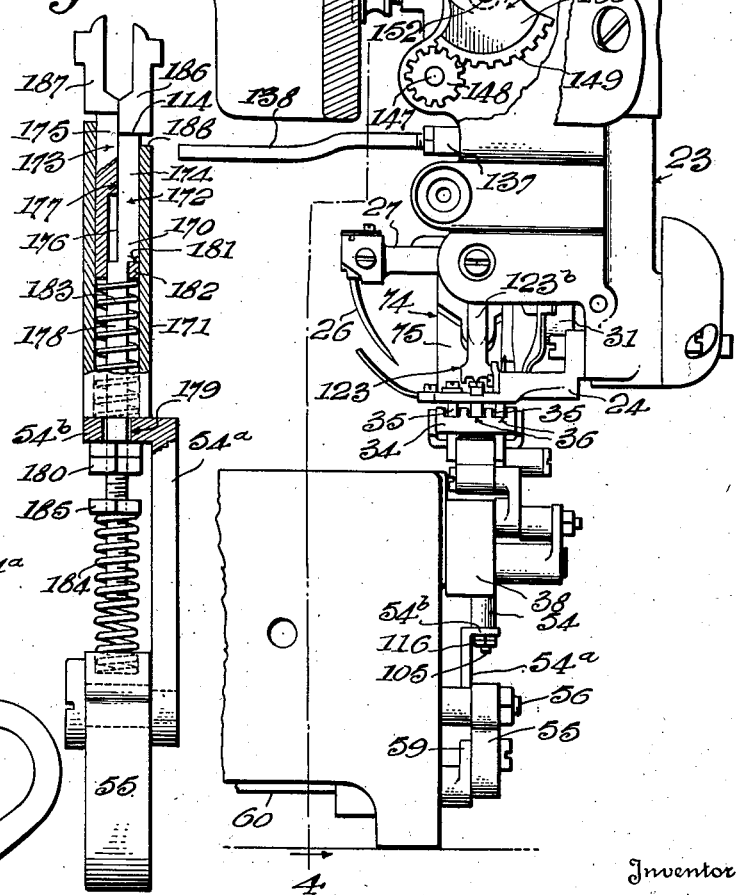

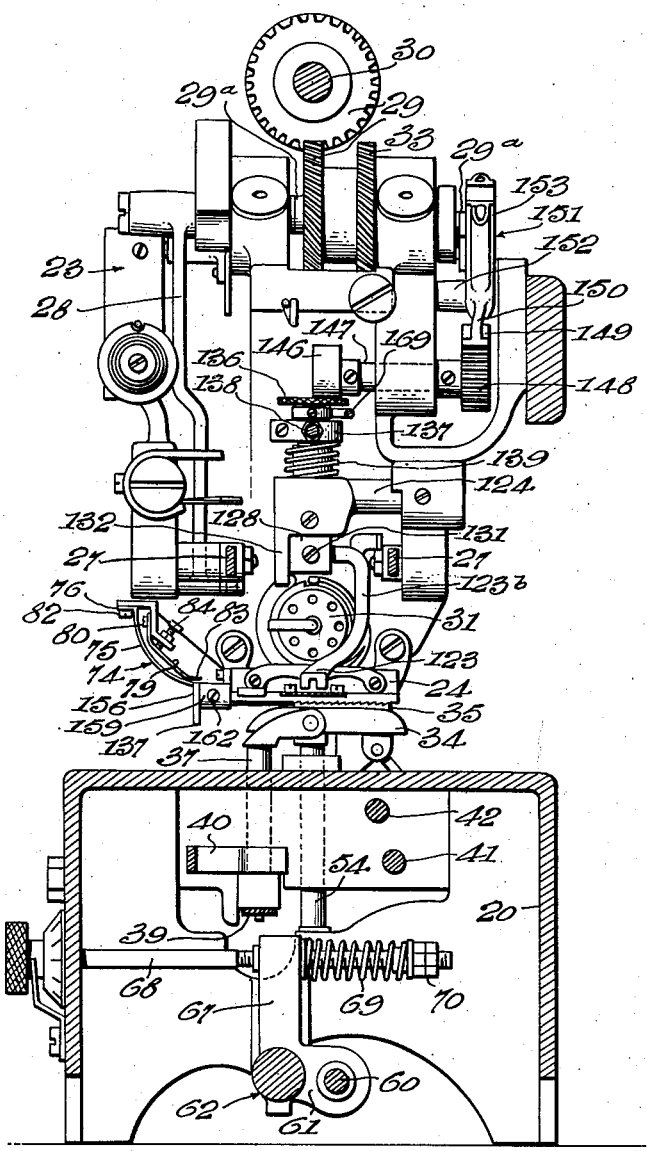

April 5, 1938.  L. G. BOWMAN  2,113,107
BLIND STITCH SEWING MACHINE
Filed Oct. 17, 1936  10 Sheets-Sheet 5
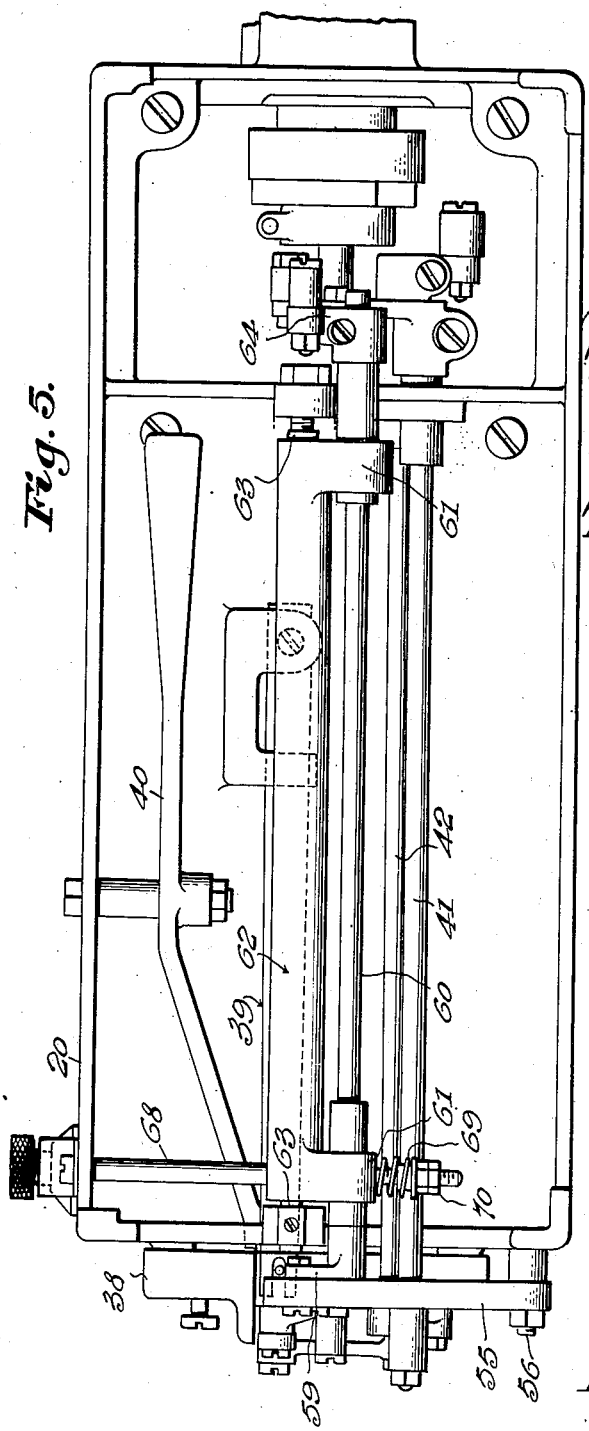
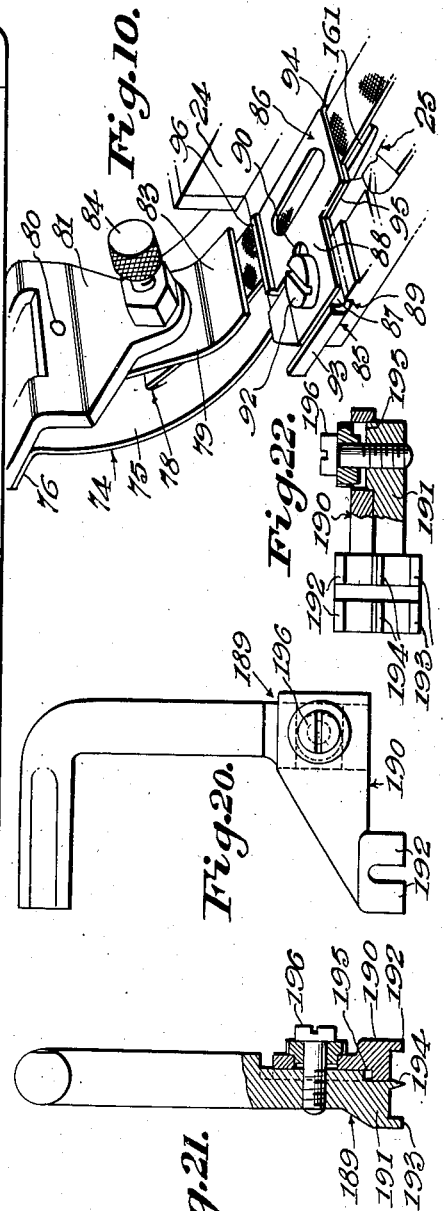
Inventor
Louis G. Bowman
By S. George Tate
Attorney

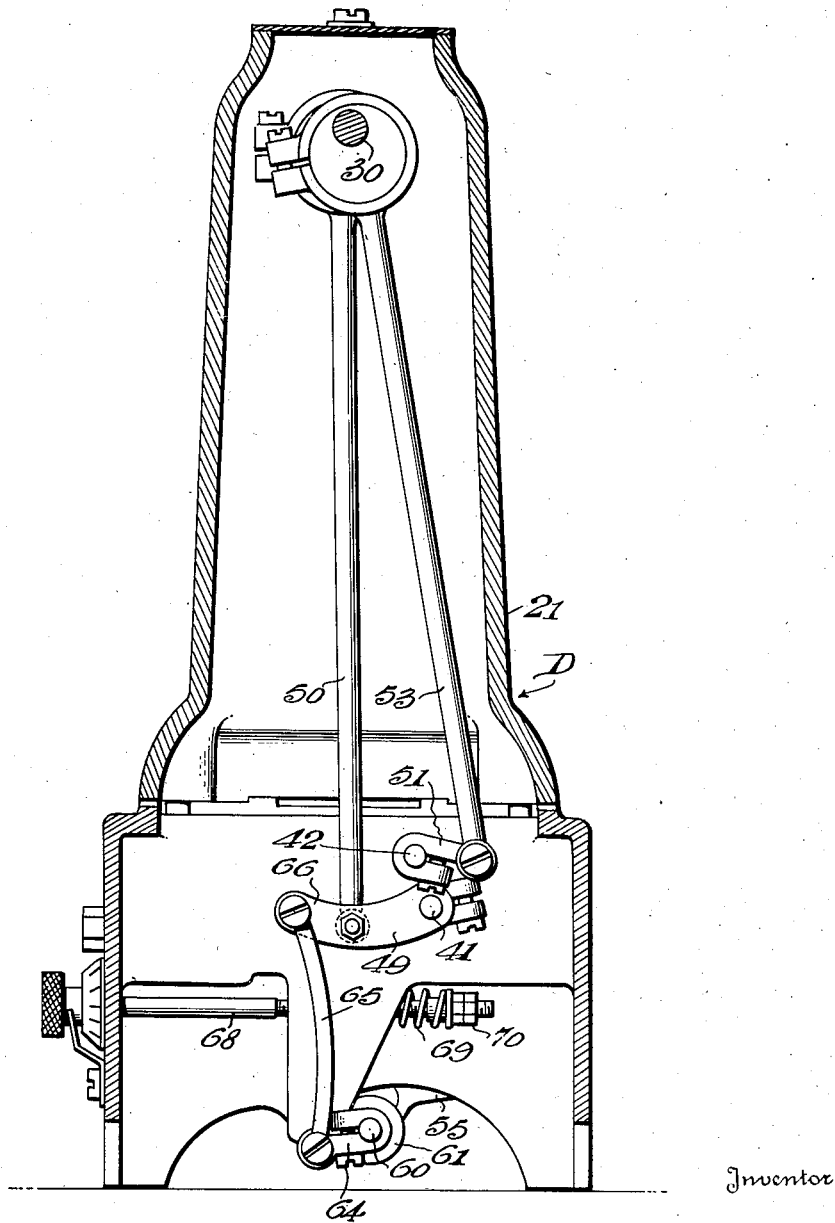

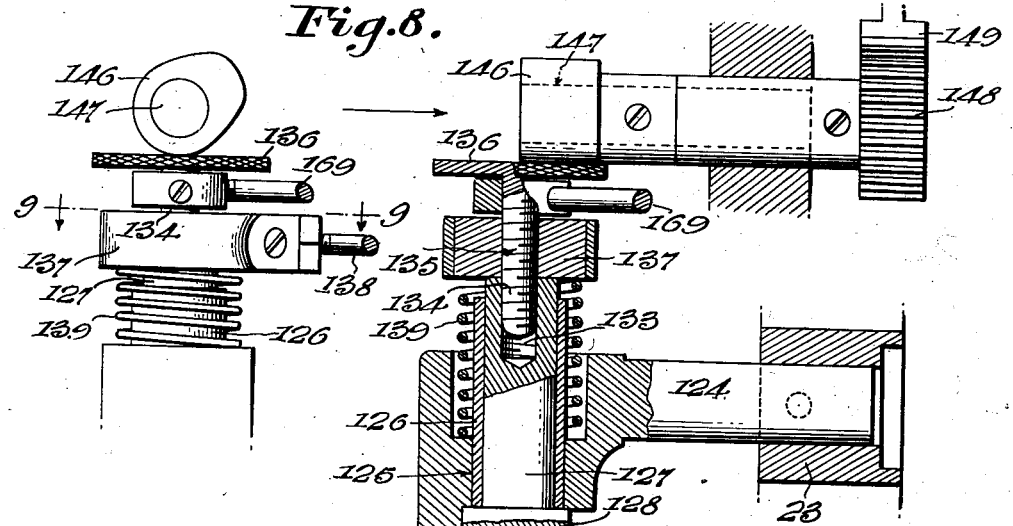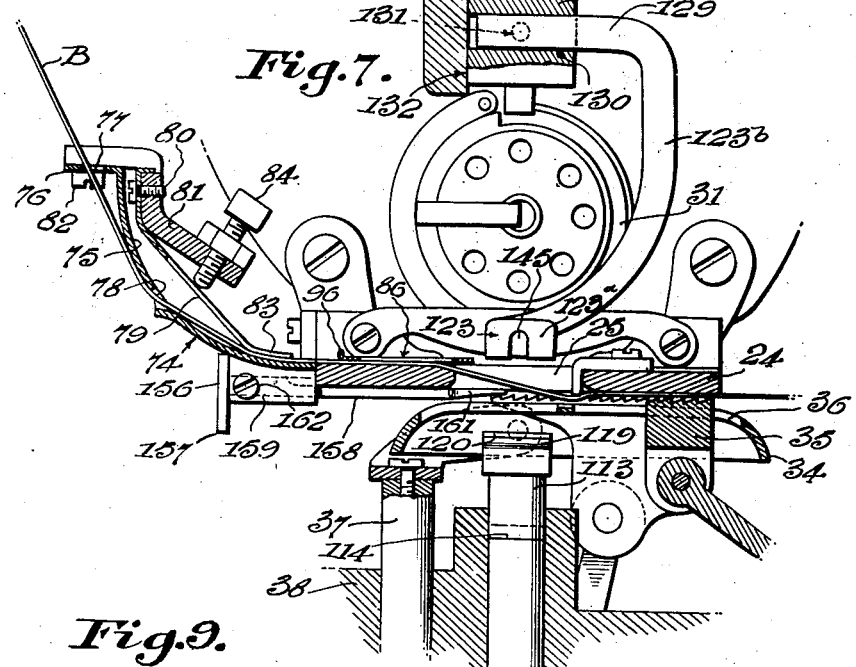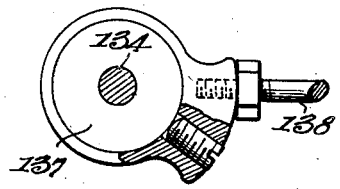

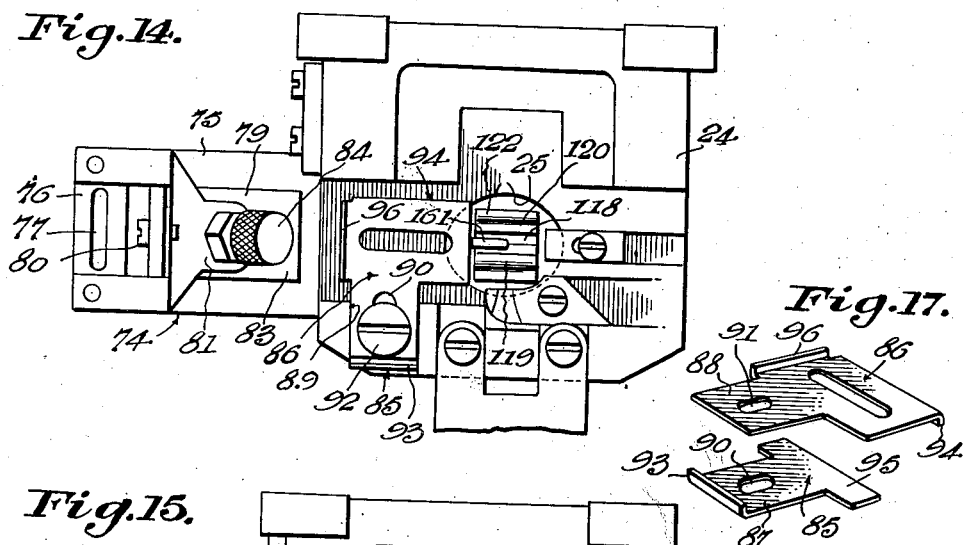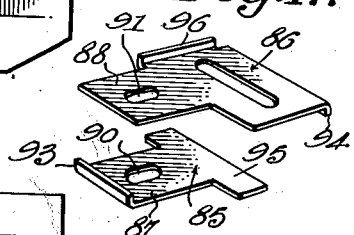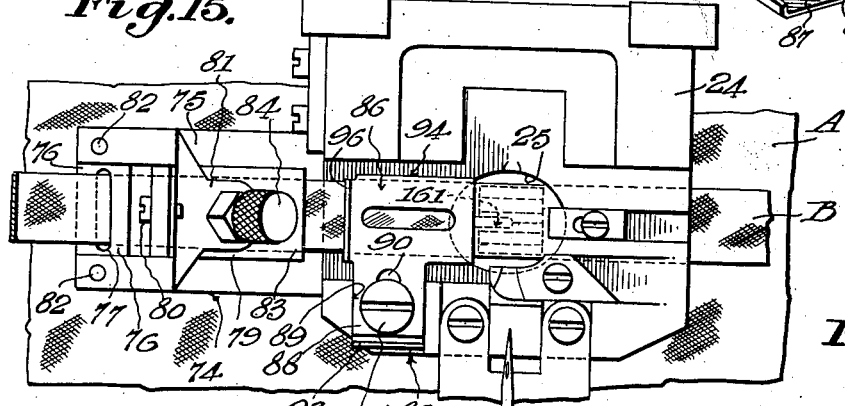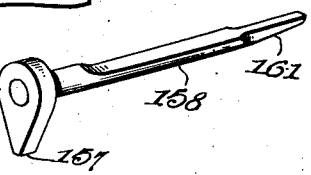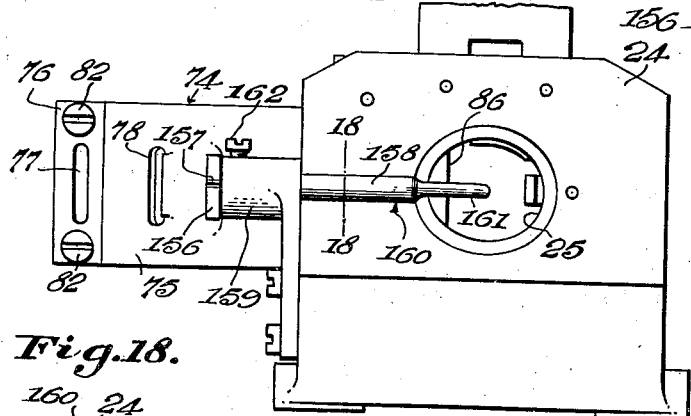

April 5, 1938.  L. G. BOWMAN  2,113,107
BLIND STITCH SEWING MACHINE
Filed Oct. 17, 1936  10 Sheets-Sheet 9

Inventor
Louis G. Bowman
By S. George Tate
Attorney

April 5, 1938. L. G. BOWMAN 2,113,107
BLIND STITCH SEWING MACHINE
Filed Oct. 17, 1936 10 Sheets-Sheet 10
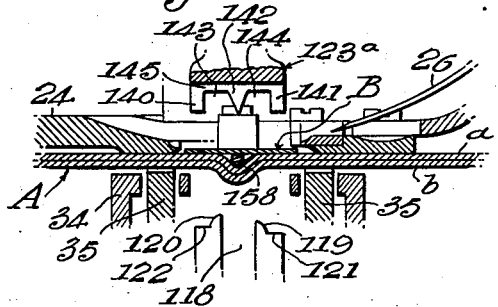
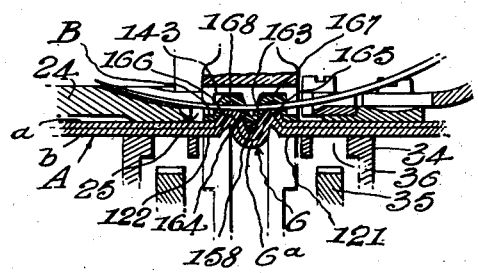
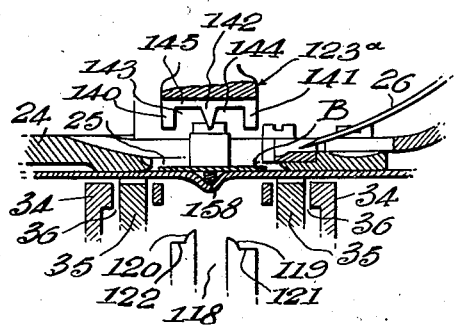
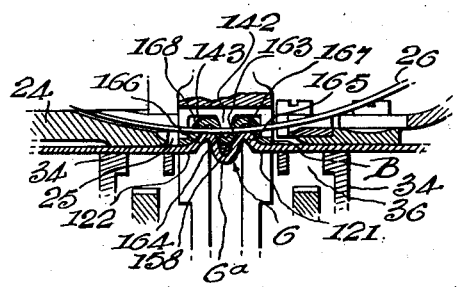
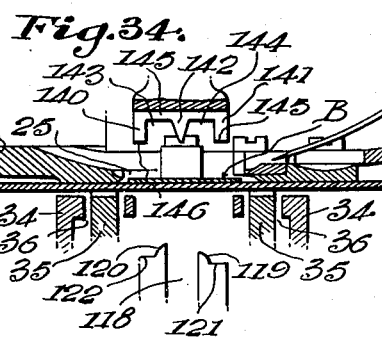
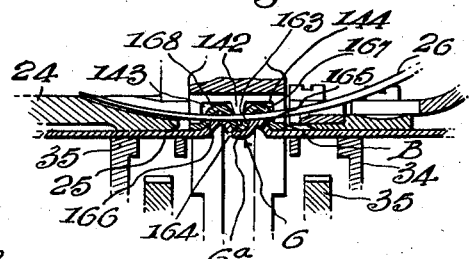
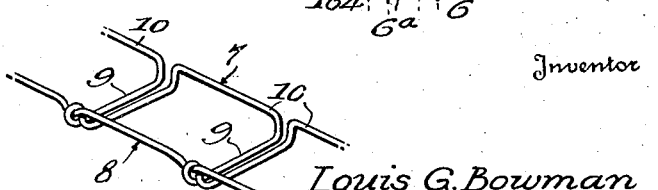
Inventor
Louis G. Bowman
By S. George Tate
Attorney Patented Apr. 5, 1938

2,113,107

UNITED STATES PATENT OFFICE 2,113,107

BLIND STITCH SEWING MACHINE

Louis G. Bowman, St. Louis, Mo., assignor to Lewis Invisible Stitch Machine Company, St. Louis, Mo., a corporation of Maine Application October 17, 1936, Serial No. 106,221

35 Claims. (Cl. 112—178)

This invention relates to new and useful improvements in sewing machines generally, although more particularly to a sewing machine of the blind stitch type for forming and retaining creases in trousers.

Among the several objects of my invention are to provide a sewing machine with a stitch forming mechanism and a work presenting mechanism whereby a trouser leg, either in its completed tubular condition or in its flat condition prior to either or both of the leg seams being formed, may be fed through the machine and a line of blind stitches formed in the inner face thereof and functioning to provide and retain a crease in said trousers; to provide means for directing a non-elastic pre-shrunken woven tape onto the body fabric in central relation to the ridge or crease thereof whereby said tape will be secured to the body fabric by the needle thread loops of the stitches at points on opposite sides of the ridge or crease; to provide means for forming the required ridges in the tape and body fabric for entrance by the needle; to provide upper and lower reciprocatory plungers for forming the ridges and clamping the same against the thrust of the needle during the penetrating stroke thereof; to provide means for variably limiting the effective height of the upper plunger or crown to thereby vary the depth of needle penetration in the body fabric; to provide adjustable edge guides for directing the tape centrally with respect to the plungers, and to provide automatic means for permitting fabrics of different thicknesses to be fed through the machine.

With these and other objects in view which will more fully appear, the nature of the invention will be more clearly understood by following the description, the appended claims, and the several views illustrated in the accompanying drawings.

Figure 25:
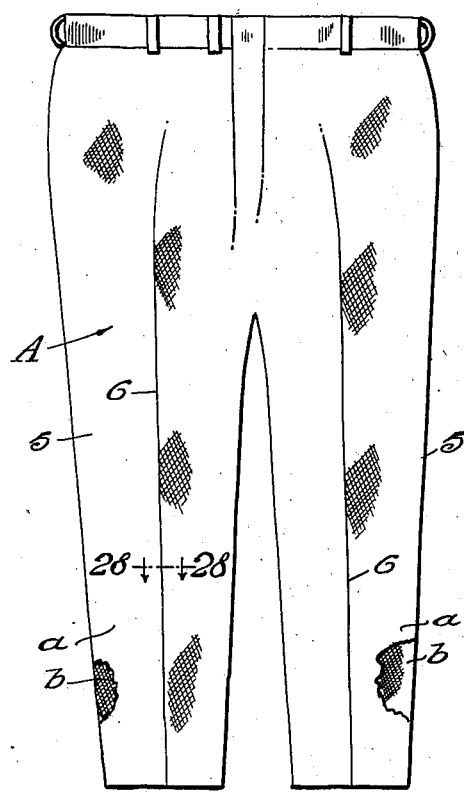
Figure 26:
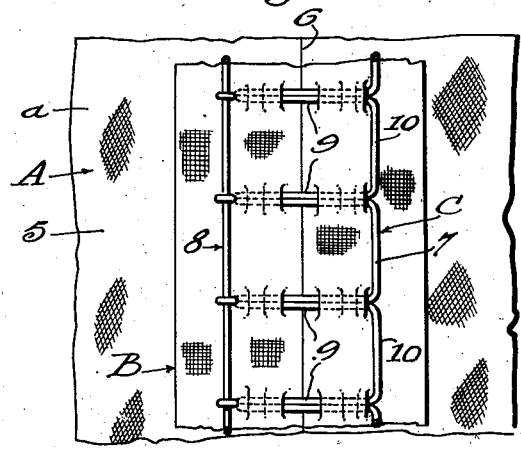
Figure 27:
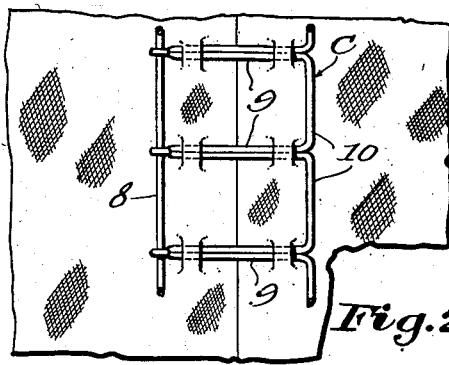
Figure 28:
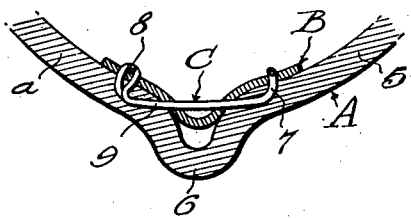
Figure 29:
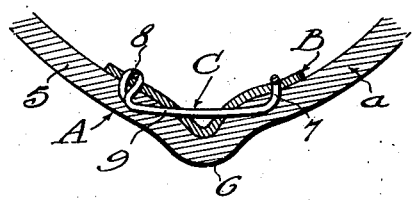

In the drawings:

Figure 1 is a front elevation of a sewing machine constructed in accordance with my invention, Figure 2 is a left end elevation thereof, Figure 3 is a rear elevation, partly in section, showing the driving mechanism for the upper plunger or crown, Figure 4 is a vertical cross sectional view taken on the line 4—4 of Figure 3, Figure 5 is a bottom plan view of the machine, Figure 6 is a vertical section taken on the line 6—6 of Figure 1, Figure 7 is an enlarged vertical section of the presser foot, the work clamp, the feed, the tape, and the upper and lower plungers, Figure 8 is a detail front elevation showing the cam means for depressing the upper plunger or crown, Figure 9 is a cross section taken on the line 9—9 of Figure 8, Figure 10 is a perspective view of the tape lead-in guide and edge guides, Figure 11 is a front elevation, partly in section, of the lower plunger, Figure 12 is a detail front elevation of the upper plunger or crown, Figure 13 is a detail bottom plan of the upper plunger or crown, Figure 14 is a top plan view of the presser foot, Figure 15 is a similar view but showing the tape and body fabric in position, Figure 16 is a bottom plan view of the foot, Figure 17 is a perspective view, showing the tape edge guides in separated relation, Figure 18 is a detail cross section taken on the line 18—18 of Figure 16, Figure 19 is a perspective view of the combined center guide and holddown tongue, Figure 20 is a side elevation showing a modified construction of upper plunger or crown, Figure 21 is a rear elevation, partly in section, of the same, Figure 22 is a bottom plan view thereof, parts being shown in section, Figure 23 is a side elevation of a modified construction of the lower plunger, Figure 24 is a front elevation thereof, partly in section, Figure 25 is a front elevation of a pair of trousers equipped with my invention, Figure 26 is an enlarged plan looking at the inner face of the body fabric and showing the tape and the single line of blind stitches which connect the tape to the body fabric at points on opposite sides of the line of ridge or crease in the body fabric, Figure 27 is a similar view but without the tape being shown, Figure 28 is an enlarged section taken on the line 28—28 of Figure 25 and showing the ridge of tape projecting towards but spaced from the ridge or crease in the trousers, Figure 29 is a similar view but showing the ridge of tape in contact with the ridge or crease of the trousers, Figure 30 is a detail sectional view showing how my method can be carried out by a sewing machine, the view showing the parts in normal positions prior to the formation of stitches, the view also showing the application of the tape to a trouser leg subsequent to the leg being side seamed, the ridge of tape being spaced from the ridge or crease in the trousers, Figure 31 is a similar view but showing the needle in position for uniting the tape to the body fabric on opposite sides of the line of ridge or crease in the body fabric, Figure 32 is a view similar to Figure 30 but showing the application of the tape to the front section of a trouser leg prior to the side seaming operation, Figure 33 is a similar view but showing the needle in position for uniting the tape to the body fabric on opposite sides of the line of ridge or crease in the trousers, Figure 34 is a view similar to Figure 32 but showing the ridge of tape in contact with the ridge or crease in the body fabric, Figure 35 is a similar view but showing the needle in position for uniting the tape to the body fabric on opposite sides of the line of ridge or crease in the body fabric, and Figure 36 is a perspective view of the single line of lock stitches.

Like reference numerals designate corresponding parts throughout the several figures of the drawings.

The article which is produced by this machine is disclosed and claimed in my co-pending application Serial No. 106,223, filed Oct. 17, 1936, for Crease retaining means for garments.

The method employed in producing the article is disclosed and claimed in my co-pending application Serial No. 106,222, filed Oct. 17, 1936, for Method of retaining creases in trousers, and the present machine illustrates one way of carrying out the steps of this method.

The article which is produced by this machine is shown in Figs. 25 to 29, and comprises a body fabric A, such as a pair of trousers which includes tubular or leg portions 5, 5, each leg portion including a front section $a$ and a rear section $b$, the front section being provided with a centrally disposed and longitudinally extending ridge or crease 6.

A pre-shrunken non-elastic tape B of woven fabric is secured against the inner face of each leg portion by a single line C of lock stitches of the blind stitch type. This tape extends longitudinally of the leg portion and is centrally disposed with respect to the crease 6, i. e., it extends equally on opposite sides thereof.

By employing a tape of non-elastic woven fabric, which has been pre-shrunken, all danger of the tape shrinking and the trousers becoming unshapely when the trousers are subjected to water or to a wet cleaning process is thereby avoided.

The tape B may be applied to formed and previously creased trousers, by turning each leg inside out and feeding the same through the machine, or the tape may be applied to the front section of a trouser leg prior to the side seaming operation thereof, or the tape may be applied to a trouser leg which has not been creased, either prior to or subsequent to the side seaming operation. If the leg has not been creased, a chalk line is preferably formed on the inner face of the leg as a guide for the operator in directing the leg through the machine.

The single line C of blind stitches includes a needle thread 7 and a bobbin thread 8. The needle thread is formed into a plurality of equally spaced needle thread loops 9 which are connected by needle thread portions 10, the needle thread loops extending in a plane at right angles to the ridge or crease 6, as shown in Figure 26, and being anchored by the bobbin thread 8.

The bobbin thread 8 and the connecting portions 10 of the needle thread 7 are disposed in parallelism with the crease 6 and are equidistant from said crease.

The present invention as illustrated herein, is embodied in a blind stitch sewing machine of the well known "Lewis" type which includes a frame D having a base 20, a standard 21, an overhanging arm 22, and a stitching head 23 attached to the free end of said arm. A horizontal presser foot 24 is rigidly attached to the lower end of the stitching head 23 and is provided with an opening 25.

A needle 26 which reciprocates above the foot and across the opening thereof, is fixed to a needle arm 27 pivoted on the stitching head 23, and is driven by a link 28 and a 1-to-1 gear coupling 29 which includes a cross shaft 29$^a$ from the main shaft 30. Cooperating with the needle 26 to form the line C of blind stitches is a rotary hook 31 which is mounted on the stitching head and is driven by a vertical shaft 32 and a gear coupling 33 from the main shaft 30, one of the gears being fixed to the cross shaft 29$^a$.

Cooperating with the under face of the presser foot to clamp the body fabric A and tape B during the penetrating strokes of the needle, is a work clamp 34, and cooperating with the under face of the foot to feed the body fabric A and the tape B past the needle 26, is a 4-motion feed dog 35 which operates in a slot 36 of the work clamp. The work clamp 34 is pivoted on the upper end of a post 37 which is slidably mounted in a block 38 attached to the end of the base 20 of the main frame and is yieldably pressed upwardly by a flat spring 39 extending longitudinally within the base. A lever 40, adapted to be actuated by a knee-press or a treadle, is also mounted in the base and is freely connected with the lower end of the post 37 to depress the latter together with the work clamp and feed dog whenever it is desired to load or unload the machine. The feed dog motion is obtained from a feed lift shaft 41 and a feed travel shaft 42 which are journaled in the base 20. A rock arm 43 is fixed to the outer end of the feed lift shaft 41 and this arm is connected by a link 44 to the vertical arm of a bell crank lever 45 pivoted at its angle to the lower end of the post 37, the horizontal arm of the bell crank lever being connected by a vertical thrust link 46 with the feed dog 35. An inclined rock arm 47 is fixed to the outer end of the feed travel shaft 42 and is connected by a link 48 with the feed dog. Thus, by means of the bell crank lever 45, the work clamp 34 is positively lowered against the tension of the spring 39 during the feeding stroke of the feed dog and then raised to engage the presser foot at the end of said feeding stroke. The feed lift shaft 41 is rocked from the main shaft 30 by an eccentric fixed to said main shaft, through the medium of a rock arm 49 fixed to the inner end of the shaft 41 and a pitman 50 which connects the eccentric with said rock arm. The feed travel shaft 42 is rocked from the main shaft 30 by an eccentric fixed to said main shaft through the medium of a rock arm 51 fixed to the inner end of said shaft 42 and a pitman 52 which connects the eccentric with said rock arm. A vertically reciprocatory plunger-supporting barrel 54 is slidably mounted in the block 38 and is disposed in alinement with the presser foot opening 25. The lower end of the barrel 54 is fixedly mounted on the upper end of an inverted L-shaped post 54ª which is pivotally connected at its lower end to a lift lever 55 pivoted at one end as at 56 to the end of the base 20. The outer end of the lever is formed with a cam groove 57 in which is located a cam roller 58 journaled on a rock arm 59 fixed to one end of a shaft 60 journaled in the rock arms 61, 61 of a cradle 62 pivoted at its ends as at 63, 63 in the base 20. The shaft 60 is provided with a rock arm 64 which is connected by a link 65 with an extension 66 of the rock arm 49 of the feed lift shaft 41, and consequently the plunger-supporting post will be reciprocated once for every reciprocation of the needle. The cradle 62 is yieldably retained against rocking movement through the medium of a rock arm 67 rigid with and extending upwardly from the cradle 62, an adjusting screw 68 which passes through the front wall of the base 20 and through the upper end of the rock arm 67, and a coil spring 69 which is interposed between the rock arm 67 and a nut 70 mounted on the inner end of the screw.

All of the above described parts of the machine are present in "Lewis" machines and it is believed that a further detail description thereof will be unnecessary.

The tape B is supplied to the machine from a spool 71 which is journaled on a horizontal arm 72 attached to a post 73 mounted on the top of the arm 22 of the machine, the free end of the tape extending downwardly in front of the stitching head 23 to a guide 74 which is attached to the front end of the presser foot 24, thence rearwardly over the foot to the opening 25 thereof, thence downwardly through the opening, and thence under the rear portion of the foot above the body fabric A, the opening being wider than the tape to permit said tape to be passed through the opening in a flat condition.

The guide 74 consists of an upwardly and forwardly curved plate 75 which terminates at its upper end in a forwardly projecting flange 76. The flange 76 is provided with a tape-receiving slot 77, and the plate intermediate the flange and the foot is provided with a tape-receiving slot 78, the tape passing downwardly through the slot 77, thence downwardly along the front curved face of the plate 75, thence through the slot 78, and thence above the foot to the opening 25 thereof. A flat spring 79 for tensioning the tape has one end connected by a screw 80 to a rearwardly and downwardly supporting arm 81 which is attached at its upper end by screws 82 to the flange 76, the free end of the spring being curved to form a substantially flat foot 83 which bears upon the tape and cooperates with the plate 75 to tension the feeding movement of the tape and also to position the tape in the horizontal plane of the upper face of the presser foot. An adjustable screw 84 is threaded into the supporting arm 81 for engaging the spring 79 and thereby apply more or less tension on the tape.

A pair of edge guides 85, 86 for the tape are mounted on the foot 24 between the tension spring 79 and the opening 25 of the foot. These guides are superposed one on the other, and are provided with attaching shanks 87, 88 which are slidably mounted in a groove 89 formed in the upper face of the foot, by means of slots 90, 91 formed in their shanks and a clamping screw 92 which passes through said slots and is threaded into the foot. The guide 85 is located below the guide 86 and is provided with an upstanding flange 93 along its outer side edge for facilitating the adjustment of said guide. The inner edge of the guide 86 is provided with a downturned flange 94 for guiding the left hand edge of the tape, while the inner edge 95 of the guide 85 serves to guide the right hand edge of said tape. The longitudinal axes of the slots 90, 91 are in a plane at right angles to the direction of feed of the tape, and consequently these guides may be readily adjusted to accommodate tapes of different widths, as well as to center the tape with respect to the ridge-forming means. The front edge of the guide 86 is provided with an upturned flange 96 for cooperation with the tape to direct the same under the guide.

As shown in Figure 11, there is mounted in the plunger-supporting barrel 54 a 2-part lower plunger or ridge forming element 97. This plunger comprises a main section 98 and an auxiliary section 99 which are mounted for relative vertical movements, the section 98 being fixed and the section 99 being movable. These sections respectively include semi-cylindrical shanks 100, 101 having flat abutting faces 102, 103 whereby when the shanks are placed together the entirety will constitute a cylindrical shank of a diameter to freely fit within the barrel 54. The relatively fixed section 98 is formed with a centrally disposed depending reduced shank extension 104 having a threaded lower end 105 which projects downwardly through the lateral arm 54ᵇ of the post 54ª. The reduced shank extension 104 is axially located within the barrel and forms a resultant stop shoulder 106 where it merges with the main shank 100. The relative movable section 99 is formed with a longitudinally extending groove 107 for receiving the reduced shank 104 when said sections are relatively moved. The movable section 99 is also provided with a laterally extending sleeve 110 at its lower end which embraces the reduced shank 104 of the fixed section. Thus, by means of the opposed flat faces, the sections are capable of having relative longitudinal movements but are incapable of having relative oscillatory movements. The shanks 100, 101 are respectively provided at their upper ends with integral heads 112, 113 forming resultant stop shoulders 114, 115 for cooperation with the upper end of the barrel 54. The shoulder 114 of the fixed section 98 is retained in close contact with the upper end of the barrel by a clamping nut 116 which engages the threaded end 105 of said shank below the lateral arm 54ᵇ of the post 54ª. Thus the section 98 is firmly clamped against longitudinal movement relative to barrel 54. A coil spring 117 is disposed around the reduced shank 104 of the fixed section 98 between the sleeve 110 of the movable section and the lower end of the barrel, and functions to yieldably retain the stop shoulder 115 of the movable section 99 in spaced relation to the upper end of the barrel, and the sleeve 110 against the shoulder 106 of the fixed section. The heads 112, 113 are conjointly formed with a vertical slot 118 having an open upper end and extending transversely of the path of needle reciprocation. The heads terminate at their upper ends in straight and parallel ridge forming elements or ribs 119, 120 respectively, and with flat horizontal shoulders 121, 122 respectively, the shoulders being located on the sides of the heads opposite the slot 118 and the ribs 119, 120 projecting upwardly above said shoulders.

Disposed above the fabric and supported on the stitching head 23 for cooperation with the lower plunger 97, is an upper plunger 123. This upper plunger is located directly above and in vertical alinement with the lower plunger, and is supported for vertical reciprocations. As shown in Figs. 6, 12 and 13, the upper plunger or crown 123 includes a head 123ᵃ integral with a hanger arm 123ᵇ. A horizontal bearing arm 124 is fixed to the stitching head 23 and is provided with a vertical bore 125 arranged in axial and vertical alinement with the lower plunger 97. A bearing sleeve or bushing 126 is fixedly secured in the bore 125, and slidably mounted in the sleeve for vertical movements is a cylindrical arm 127 having an angular head 128 at its lower end. The hanger arm 123ᵇ terminates at its upper end in a forwardly extending arm 129 which is positioned in a horizontal opening 130 formed in the head 129 and is secured therein by a set screw 131. The front flat face of the head 128 has slidable contact with a stationary guide 132 integral with and depending from the bearing arm 124 and functions to retain the upper plunger from rotation about the axis of the cylindrical arm 127 and to permit said arm to be reciprocated vertically. The upper end of the arm 127 is formed with a downwardly extending threaded recess 133 for adjustably receiving the threaded shank 134 of a screw 135 having a head 136. A clamping nut 137 which is provided with a crank handle 138, is threaded on the shank 134 and normally bears against the upper end of the arm 127 for retaining the arm and the screw against relative longitudinal movement. A coil spring 139 is disposed around the bushing 126 between the bearing arm 124 and the nut 137 and functions to yieldably retain the head 128 against downward movement relative to the arm 124.

The head 123ᵃ of the upper plunger is provided with three downwardly projecting spaced ribs arranged in parallelism with one another and with the ribs 119, 120 of the lower plunger but in offset or complementary relation to the latter. These three ribs include spaced side clamping ribs 140, 141 and an intermediate ridge forming rib 142 which is located centrally between and spaced from the side ribs to form resultant grooves 143, 144 for receiving the upwardly projecting ribs 119, 120 of the lower plunger. The lower faces 145, 146 of the clamping ribs 140, 141 are flat for cooperation with the flat shoulders 121, 122 of the lower plunger. The intermediate rib 142 is V-shaped in cross section and is projectable into the groove 118 of the lower plunger. It will be noted that the grooves 118, 143 and 144 of the plungers extend in the line of feed, or in other words, at right angles to the path of needle movement. The upper plunger head, when at the lower end of its down stroke, intercepts the path of needle travel, and is therefore provided with a transverse groove 145 for receiving the needle, the groove 145 extending centrally through the ribs 140, 142 and 141. The lower plunger and the upper plunger are moved simultaneously upwardly and downwardly respectively to clamp and release the body fabric A and the tape B.

To this end a cam 146 is fixed to the end of a horizontal shaft 147 journaled in the stitching head 23, and contacts the head 136 of the screw 135, the head being maintained in yieldable engagement with the cam by the coil spring 139. Fixed to the shaft 147 is a pinion 148 which is rotated by a segmental gear 149 on an arm 150 of a lever 151 pivoted intermediate its ends as at 152 on the stitching head, the other arm 153 of the lever forming a fork having sliding engagement with a block 154 journaled on an eccentric pin 155 fixed to the cross shaft 29ᵃ. Thus it will be seen that the upper plunger is positively moved downwardly during the beginning of each penetrating stroke of the needle, and that the spring 139 not only functions to maintain the screw in engagement with the cam 146 but also to impart the up stroke to the upper plunger.

To assist the operator in centering either the preformed crease 6 in the body fabric or the chalk line on the body fabric, with respect to the tape, I have provided the presser foot with a center guide 156 which projects forwardly and downwardly and terminates in a point 157 located below the bottom of the foot. This guide is rigidly connected to a rearwardly extending pin or hold-down tongue 158 which is slidably mounted for longitudinal movements in a bearing 159 fixed to the foot, the pin in rear of the bearing being slidably mounted in a slot 160 formed in the bottom of the foot, and the rear end of the pin on its under face being upwardly tapered as at 161 and projecting into the presser foot opening 25 and in position to be received by the groove 118 of the lower plunger. This pin is retained in an adjusted position by a screw 162 threaded into the bearing 159.

In operation, the trousers or body fabric A and the superposed tape B are fed to the needle. The upper and lower plungers are timed to move simultaneously downwardly and upwardly respectively whereby their heads will be in cooperative clamping relation just prior to the needle entering the transverse groove 145 of the upper plunger. The plungers are then held in their cooperative relation by the cams 57 and 146 until after the needle begins its backward stroke.

If the tape B is to be applied to trousers A which have been side seamed and creased, as illustrated in Figs. 30 and 31, the trousers are first turned inside out. One leg of the trousers with the front section $a$ above the bottom section $b$, is intermittently fed through the machine together with the superposed tape B which is positioned against the inner top face of the front section $a$ and centrally with respect to the downwardly projecting ridge or crease 6 thereof. Each time the feed dog is idle and the needle is out of the work, the upper plunger or crown 123 and lower plunger 97 move towards each other and clamp the crimped work therebetween. The ridge or crease 6 is positioned under the tongue 158 and is held below and in spaced relation to the path of needle travel by said tongue, the crease being located in the groove 118 of the lower plunger 97. The center rib 142 of the upper plunger or crown forms a centrally located and downwardly projecting ridge 163 in the tape B which is disposed in the ridge 6 of the body fabric, the apex 164 being located above the tongue 158 and consequently in spaced relation to the apex 6ᵃ of the ridge or crease 6. The ribs 119, 120 of the lower plunger form upwardly projecting ridges 165, 166 in the body fabric and superposed ridges 167, 168 in the tape, the ridges 165, 166 and the ridges 167, 168 being respectively disposed in the grooves 143, 144 of the upper plunger or crown and in the path of needle travel, and the lower faces 145, 146 of the clamping ribs 140, 141 cooperate with the shoulders 121, 122 to clamp the tape and body fabric therebetween against the thrust of the needle during the penetrating stroke thereof.

The needle then projects a needle thread loop 9 through the superposed ridges 165, 167 of the body fabric and tape which are on one side of the line of ridge or crease 6, and then through the superposed ridges 166, 168 of the body fabric and tape which are on the other side of said line of ridge or crease 6. The needle thread loop 9 is then anchored by the bobbin thread 8. The needle is then withdrawn from the work, the plungers 123, 97 are separated, the work clamp 34 is lowered, and the feed dog 35 then functions to feed the work a stitch length distance.

It will be observed that each needle thread loop 9 anchors the tape B to the body fabric A on opposite sides of the line of ridge or crease 6, and that said loop passes entirely through the central longitudinal ridge 163 of the tape. The tension of the needle thread loops is such as to maintain the ridge 163 of the tape in its projected relation towards the ridge or crease 6, and consequently the loops constitute braces or ties which function to retain the ridge or crease 6 in shape, while at the same time the non-elastic woven tape, which extends along the leg from a point well below the knee to a point well above the same, functions to retain the trouser leg from bagging at the knee.

If the trousers A have not been side seamed, then the front section $a$ only of a trouser leg is fed through the machine as illustrated in Figs. 32 and 33.

It may be desirable to have the ridge 163 of the tape B project fully into the ridge or crease 6 of the body fabric, as shown in Fig. 29, and this is accomplished as shown in Figs. 34 and 35, by retracting the tongue 158 to permit the center rib 142 of the upper plunger or crown to form both the downwardly projecting ridges 163 and 6 in the tape and body fabric.

From the foregoing, it will be observed that I first place the tape B on the body fabric A and form the outwardly projecting ridge 6 in the body fabric, and then secure the tape to the body fabric by passing a single line of connected needle thread loops through the tape and body fabric at points on opposite sides of the ridge and in spaced relation to the apex thereof.

It will be understood that the work is stationary during this clamping action of the plungers and also while the needle is in the work. The needle 26 in its forward or penetrating stroke passes through the upwardly projecting ridges of the tape and body fabric and cooperates with the rotary hook 31 to form the line C of blind stitches. The needle is then retracted, the lower plunger is moved downwardly by the cam 57, the upper plunger is moved upwardly by the spring 139, and the feed dog 35 is given its feeding stroke to feed the body fabric and the tape a stitch length distance.

The needle 26 moves in a fixed horizontal path and the depth of needle penetration in the fabric is therefore necessarily determined by the position of the upper plunger relative to the horizontal path of needle travel when the plunger is at the lower end of its stroke. Inasmuch as different kinds and weights of body fabrics are employed, it is desirable to provide means for varying the depth of needle penetration. I have therefore provided means for adjusting the vertical position of the upper plunger or crown when the latter is at the lower end of its stroke. For this purpose, a crank handle 169 is rigidly secured to the screw 136 at a point directly below the head thereof and above the clamping nut 137. By first loosening the clamping nut 137 by its handle 138 so as to free said nut from the cylindrical arm 127, and then turning the screw 136 by the handle 169, the arm 127 will be moved either upwardly towards or downwardly from the screw head 136 depending on the direction the nut is turned. After the adjustment has been completed, the nut 137 is again clamped against the arm 127 to thereby retain the screw and arm against relative movement.

Inasmuch as the upper plunger or crown 123 when at the lower end of its stroke, is firmly held by the cam 146 against free upward movement, it is necessary for the lower plunger to yield downwardly when fabrics are placed between the plungers. In the machine, as thus far described, the lower plunger will yield downwardly a distance equal to the thickness of the fabric. This yield of the plunger is permitted by the coil spring 69 and cradle 62.

In order to eliminate the spring 69, I have provided a modified lower plunger 170 as illustrated in Figs. 23 and 24. When this modified lower plunger is employed, the plunger rock shaft 60 will be journaled in fixed bearings mounted on the base 20 of the machine frame. The lower plunger is mounted in a barrel 171 and comprises a main section 172 and an auxiliary section 173 which are independently and slidably mounted in the barrel for relative longitudinal movements with respect to each other and to the barrel. These sections respectively include semi-cylindrical shanks 174, 175 having flat abutting faces 176, 177 whereby when the shanks are placed together the entirety will constitute a cylindrical shank of a diameter to freely fit within the barrel 171. The main section 172 is formed with a centrally disposed depending reduced shank extension 178 which projects downwardly and is slidable through an opening 179 formed in the arm 54$^b$ of the post 54$^a$. The lower end of the shank extension 178 terminates above and in spaced relation to the cam lever 55. The extension is threaded to receive a nut 180 which is adapted to contact the under face of the arm 54$^b$. A stop shoulder 181 is formed on the main section 172 between the shank 174 and the extension 178. The auxiliary section 173 is provided with a laterally extending sleeve 182 at its lower end for receiving the shank extension 178. A relatively light coil spring 183 is disposed around the reduced shank 178 between the sleeve 182 and the arm 54$^b$ and functions to yieldably retain both sections against relative longitudinal movement, yet permitting both sections to yield downwardly. A relatively heavy coil spring 184 is disposed around the lower end of the shank extension 178 between the cam lever 55 and a nut 185 which is threaded onto the shank extension below the nut 180. This relatively heavy spring 184 functions to yieldably retain the main plunger section 172 against depression, and the relatively light spring 183 functions to permit the auxiliary plunger section 173 to be depressed relative to the main section. The main and auxiliary sections 172 and 173 are provided with ridge forming heads 186, 187 which are similar in construction to the heads 112, 113 previously described. It will be noted that in this modified construction, the upper end 188 of the barrel is cut away under the shoulder 114 of the head 186 to permit the main section to be depressed. Thus, when a fabric of increased thickness is positioned in the machine the main section 172 will be depressed against the tension of the relatively strong spring 184.

In Figs. 20, 21 and 22, I have illustrated a slightly modified upper plunger or crown wherein the plunger head 189 comprises two longitudinal sections 190, 191, the auxiliary section 190 being provided with a clamping rib 192, and the main section 191 being provided with a clamping rib 193 and a ridge forming rib 194. The auxiliary section 190 is attached to the main section 191 by means of a tongue and groove connection 195 and a clamping screw 196 which permits of the auxiliary section being vertically adjusted with respect to the main section.

It is of course to be understood that the details of structure and arrangement of parts may be variously changed and modified without departing from the spirit and scope of my invention.

I claim:

1. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape centrally to said opening and above the body fabric, and means for forming and projecting simultaneously spaced ridges of combined body fabric and tape upwardly through the opening into needle penetrating position.

2. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge.

3. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, the lower ridge forming element being vertically reciprocatory in timed relation to the needle reciprocations.

4. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, the upper ridge forming element being vertically reciprocatory in timed relation to the needle reciprocations.

5. In a blind stitch sewing machine, the combination with a stationary presser foot having an opening therein, of a stitch forming mechanism located above the foot and including a reciprocatory needle having its path of movement across said opening, means for intermittently feeding a body fabric below the foot past the needle, means for guiding a tape downwardly through the opening onto said body fabric, upper and lower vertically reciprocatory plungers disposed above and below the presser foot opening for forming and presenting to the needle a downwardly projecting ridge in the tape and body fabric and an upwardly projecting ridge in the body fabric offset from the downwardly projecting ridge, and means for moving the plungers toward each other during one stroke of reciprocation and for moving the plungers away from each other during the other stroke of reciprocation.

6. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, said ridge forming elements being constructed to clamp the edges of the tape and the body fabric therebetween to thereby retain the ridges in the tape and body fabric against the thrust of the needle during the penetrating stroke thereof.

7. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, the upper ridge forming element having spaced depending side clamping ribs and a centrally located depending ridge forming rib forming resultant spaces therebetween, the lower ridge forming element having spaced upwardly projecting ridge forming ribs movable into said spaces and spaced apart to receive the central depending ridge forming rib of the upper element, the lower element on opposite sides of the ridge forming ribs being provided with clamping shoulders for cooperation with the clamping ribs of the upper element to clamp the edges of the tape and the body fabric therebetween to thereby retain the ridges in the tape and body fabric against the thrust of the needle during the penetrating stroke thereof.

8. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, said ridge forming elements being vertically reciprocatory in timed relation with the needle reciprocations, the elements being movable towards each other prior to the needle penetrating the tape and body fabric and being movable away from each other when the needle is out of the tape and body fabric.

9. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, said ridge forming elements being constructed to clamp the edges of the tape and the body fabric therebetween to thereby retain the ridges in the tape and body fabric against the thrust of the needle during the penetrating stroke thereof, said ridge forming elements being vertically reciprocatory in timed relation with the needle reciprocations, the elements being movable towards each other prior to the needle penetrating the tape and body fabric and being movable away from each other when the needle is out of the tape and body fabric.

10. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, the upper ridge forming element having spaced depending side clamping ribs and a centrally located depending ridge forming rib forming resultant spaces therebetween, the lower ridge forming element having spaced upwardly projecting ridge forming ribs movable into said spaces and spaced apart to receive the central depending ridge forming rib of the upper element, the lower element on opposite sides of the ridge forming ribs being provided with clamping shoulders for cooperation with the clamping ribs of the upper element to clamp the edges of the tape and the body fabric therebetween to thereby retain the ridges in the tape and body fabric against the thrust of the needle during the penetrating stroke thereof, said ridge forming elements being vertically reciprocatory in timed relation with the needle reciprocations, the elements being movable towards each other prior to the needle penetrating the tape and body fabric and being movable away from each other when the needle is out of the tape and body fabric.

11. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, the lower ridge forming element being vertically reciprocatory in timed relation to the needle reciprocations and being bodily depressible to accommodate fabrics of different thicknesses.

12. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, the upper element being vertically adjustable to vary its effective height to thereby vary the depth of needle penetration in the ridges of tape and body fabric.

13. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, said ridge forming elements being vertically reciprocatory in timed relation with the needle reciprocations, the elements being movable towards each other prior to the needle penetrating the tape and body fabric and being movable away from each other when the needle is out of the tape and body fabric, the upper element being vertically adjustable to vary its effective height to thereby vary the depth of needle penetration in the ridges of tape and body fabric.

14. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape downwardly through the opening onto said body fabric, and upper and lower cooperating ridge forming elements respectively disposed above and below the presser foot opening for forming and presenting to the needle a downwardly projecting ridge in the tape and body fabric and an upwardly projecting ridge in the body fabric offset from the downwardly projecting ridge, said ridge forming elements being vertically reciprocatory in timed relation with the needle reciprocations, the elements being movable towards each other prior to the needle penetrating the tape and body fabric and being movable away from each other when the needle is out of the tape and body fabric, the upper element being vertically adjustable to vary its effective height to thereby vary the depth of needle penetration in the ridges of tape and body fabric, the lower element being bodily depressible to accommodate fabrics of different thicknesses.

15. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, a lead-in guide mounted on the front end of the foot for directing a tape downwardly and rearwardly to said opening, edge guides mounted on the foot between the lead-in guide and the opening for directing the tape centrally to said opening, and means for forming and projecting simultaneously spaced ridges of combined body fabric and tape upwardly through the opening into needle penetrating position.

16. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, means for guiding a tape centrally to said opening and above the body fabric, means mounted on the foot in front of the opening for applying a tensioning drag on the tape, and means for forming and projecting simultaneously spaced ridges of combined body fabric and tape upwardly through the opening into needle penetrating position.

17. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, a lead-in guide mounted on the front end of the foot for directing a tape downwardly and rearwardly to said opening, edge guides mounted on the foot between the lead-in guide and the opening for directing the tape centrally to said opening, means mounted on the foot in front of the opening for applying a tensioning drag on the tape, and means for forming and projecting simultaneously spaced ridges of combined body fabric and tape upwardly through the opening into needle penetrating position.

18. In a blind stitch sewing machine, the combination with a stationary presser foot having an opening therein, of a stitch forming mechanism located above the foot and including a reciprocatory needle having its path of movement across said opening, means for feeding a body fabric below the foot past the needle, a lead-in guide mounted on the front end of the foot for directing a tape downwardly and rearwardly to said opening, laterally adjustable edge guides mounted on the foot between the lead-in guide and the opening for directing the tape centrally to said opening, and means for forming and projecting simultaneously spaced ridges of combined body fabric and tape upwardly through the opening into needle penetrating position.

19. In a blind stitch sewing machine, the combination of upper and lower vertically reciprocatory plungers arranged for work-ridging cooperation, and means for reciprocating the plungers.

20. In a blind stitch sewing machine, the combination of upper and lower vertically reciprocatory plungers arranged for work-ridging cooperation, and means for moving the plungers toward each other during one stroke of reciprocation and for moving the plungers away from each other during the other stroke of reciprocation.

21. In a blind stitch sewing machine, the combination of upper and lower vertically reciprocatory plungers arranged for work-ridging cooperation, and means for moving the plungers toward each other simultaneously during one stroke of reciprocation and for moving the plungers away from each other simultaneously during the other stroke of reciprocation.

22. In a blind stitch sewing machine, the combination of upper and lower vertically reciprocatory plungers arranged for work-ridging cooperation, a main shaft, and separate driving connections between the plungers and the shaft for reciprocating said plungers.

23. In a blind stitch sewing machine, the combination of upper and lower vertically reciprocatory plungers arranged for work-ridging cooperation, a main shaft, and separate driving connections between the plungers and the shaft for moving the plungers toward each other during one stroke of reciprocation and for moving the plungers away from each other during the other stroke of reciprocation.

24. In a blind stitch sewing machine, the combination of upper and lower vertically reciprocatory plungers arranged for work-ridging cooperation, a main shaft, and separate driving connections between the plungers and the shaft for moving the plungers toward each other simultaneously during one stroke of reciprocation and for moving the plungers away from each other simultaneously during the other stroke of reciprocation.

25. In a blind stitch sewing machine, the combination of upper and lower vertically reciprocatory plungers having cooperating offset ridge-forming ribs on their inner ends for forming resultant upwardly and downwardly projecting ridges in a fabric, and means for reciprocating said plungers.

26. In a blind stitch sewing machine, the combination of upper and lower vertically reciprocatory plungers having cooperating offset ridge-forming ribs on their inner ends for forming resultant upwardly and downwardly projecting ridges in a fabric, and means for moving the plungers toward each other during one stroke of reciprocation and for moving the plungers away from each other during the other stroke of reciprocation.

27. In a blind stitch sewing machine, the combination of upper and lower vertically reciprocatory plungers having cooperating offset ridge-forming ribs on their inner ends for forming resultant upwardly and downwardly projecting ridges in a fabric, and means for moving the plungers toward each other simultaneously during one stroke of reciprocation and for moving the plungers away from each other simultaneously during the other stroke of reciprocation.

28. In a blind stitch sewing machine, the combination of upper and lower vertically reciprocatory plungers having cooperating offset ridge-forming ribs on their inner ends for forming resultant upwardly and downwardly projecting ridges in a fabric, a main shaft, and separate driving connections between the plungers and the shaft for reciprocating said plungers.

29. In a blind stitch sewing machine, the combination of upper and lower vertically reciprocatory plungers having cooperating offset ridge-forming ribs on their inner ends for forming resultant upwardly and downwardly projecting ridges in a fabric, a main shaft, and separate driving connections between the plungers and the shaft for moving the plungers toward each other during one stroke of reciprocation and for moving the plungers away from each other during the other stroke of reciprocation.

30. In a blind stitch sewing machine, the combination of upper and lower vertically reciprocatory plungers having cooperating offset ridge-forming ribs on their inner ends for forming resultant upwardly and downwardly projecting ridges in a fabric, a main shaft, and separate driving connections between the plungers and the shaft for moving the plungers toward each other simultaneously during one stroke of reciprocation and for moving the plungers away from each other simultaneously during the other stroke of reciprocation.

31. In a blind stitch sewing machine, the combination with a main frame including a stitching head, of a main shaft journaled in said frame, a horizontal presser foot rigidly connected to said head and having an opening, a stitch forming mechanism mounted on the head and including a reciprocatory needle having its path of movement across said opening, a lower ridge-forming element disposed below the presser foot for projecting a ridge of material upwardly through the opening into needle penetrating position, a cooperating upper ridge-forming element mounted on the head for vertical reciprocations, a spring for normally urging the upper element upwardly, and means operated from the main shaft and including a cam for moving the upper element downwardly into cooperative relation with the lower element in timed relation to the needle reciprocations.

32. In a blind stitch sewing machine, the combination with a main frame including a stitching head, of a main shaft journaled in said frame, a horizontal presser foot rigidly connected to said head and having an opening, a stitch forming mechanism mounted on the head and including a reciprocatory needle having its path of movement across said opening, a lower ridge-forming element disposed below the presser foot for projecting a ridge of material upwardly through the opening into needle penetrating position, a cooperating upper ridge-forming element mounted on the head for vertical reciprocations, a spring for normally urging the upper element upwardly, means operated from the main shaft and including a cam for moving the upper element downwardly into cooperative relation with the lower element in timed relation to the needle reciprocations, and adjustable means for variably limiting the effective height of the upper element to thereby vary the depth of needle penetrations in the ridged fabric.

33. In a lower plunger mechanism, the combination with a vertically reciprocatory plunger comprising a main section and an auxiliary section, a relatively light spring interposed between the sections, and a relatively heavy spring for resisting the depression of the main section.

34. In a lower plunger mechanism, the combination with a vertically reciprocatory barrel, of means for reciprocating said barrel including a rock arm pivotally connected to the barrel, a plunger supported in the barrel and comprising main and auxiliary sections mounted in the barrel for relative longitudinal movements, and both sections being movable longitudinally with respect to the barrel, a relatively light spring interposed between the sections, and a relatively heavy spring interposed between the main section and the rock arm for resisting the depression of the main section.

35. In a lower plunger mechanism, the combination with a vertically reciprocatory barrel, of means for reciprocating said barrel including a rock arm pivotally connected to the barrel, a plunger supported in the barrel and comprising main and auxiliary sections mounted in the barrel for relative longitudinal movements, and both sections being movable longitudinally with respect to the barrel, a relatively light spring interposed between the sections, a relatively heavy spring interposed between the main section and the rock arm for resisting the depression of the main section, and means for adjusting the tension of the relatively heavy spring.

LOUIS G. BOWMAN.